UNITED STATES PATENT OFFICE.

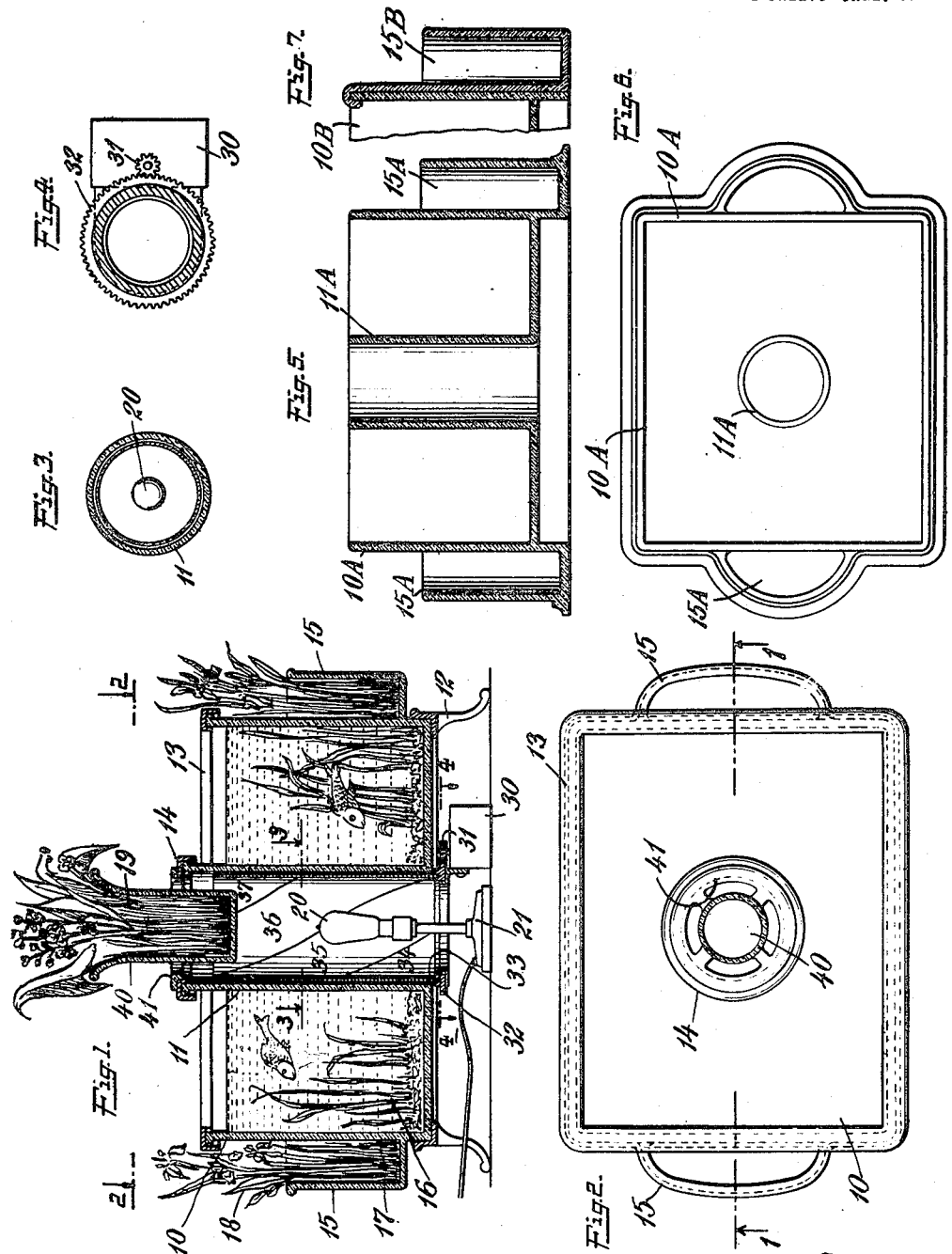

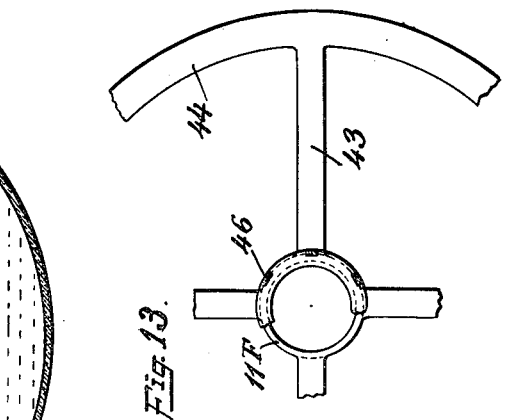
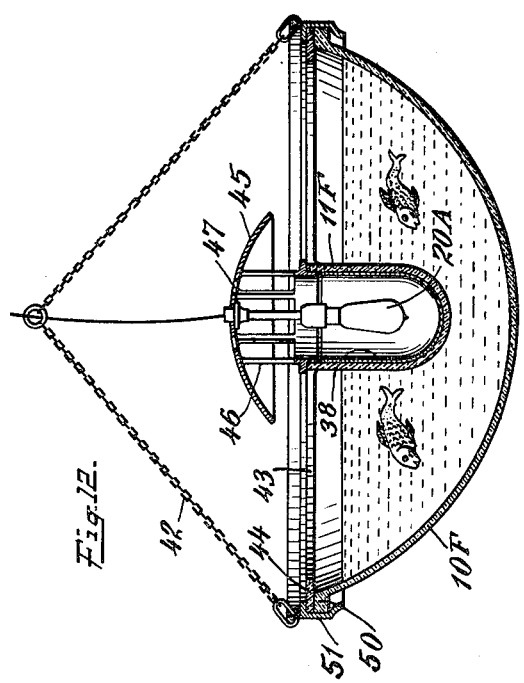
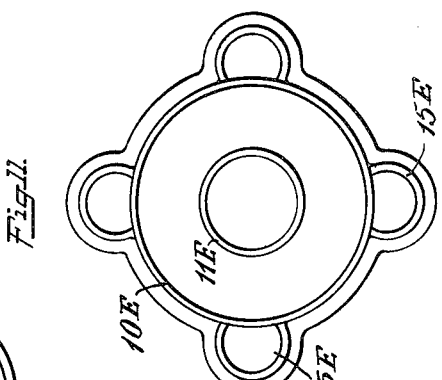
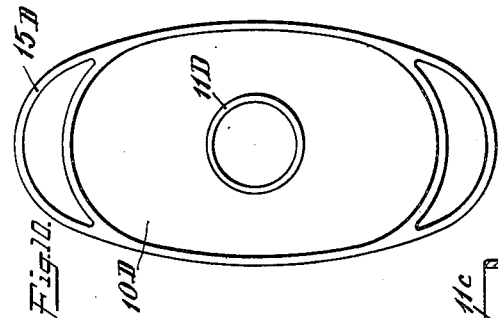
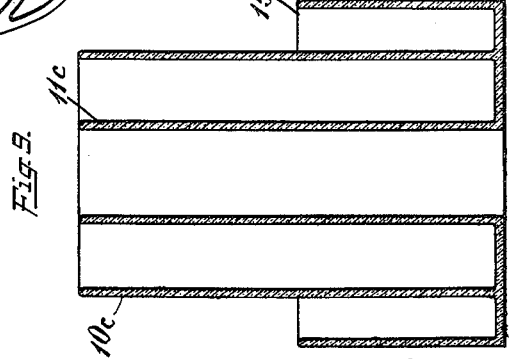
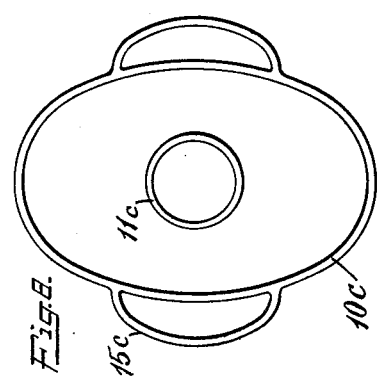

RUDOLF EICKEMEYER, OF YONKERS, NEW YORK.

ORNAMENTAL AQUARIUM.

1,263,391.　　　　　Specification of Letters Patent.　　Patented Apr. 23, 1918.

Application filed March 3, 1916.　Serial No. 81,815.

*To all whom it may concern:*

Be it known that I, RUDOLF EICKE-MEYER, a citizen of the United States of America, and a resident of Yonkers, Westchester county, and State of New York, have invented certain new and useful Improvements in Ornamental Aquariums, of which the following is a specification, reference being had to the accompanying drawings, forming a part thereof.

My invention relates to improvements in aquariums and its object is to make such structures more useful, attractive and pleasing to the eye. More specifically its object is to provide a simple construction which makes possible artificial lighting of aquariums and their contents, and further, to provide for the reception of ornamental grasses or flowers outside of the water receptacle which will harmonize with the aqueous vegetation such as is commonly placed within such aquariums, and with the living creatures within the aquarium the artificial lighting may coöperate to produce unusual and beautiful effects.

Other objects of my invention will be set forth hereinafter, and in order that my invention may be thoroughly understood I will now proceed to describe the same in the following specification and then point out the novel features thereof in appended claims.

Referring to the drawings:

Figure 1 is a longitudinal sectional elevation of an aquarium which embodies my invention. The section in this figure is taken on the line 1—1 of Fig. 2.

Fig. 2 is a plan view of the structure shown in Fig. 1, the upper part of which is shown in section, the view in this figure being taken on the line 2—2 of Fig. 1.

Figs. 3 and 4 are sectional plan views of portions of the structure shown in Fig 1, these sections being taken respectively on the lines 3—3 and 4—4 of Fig. 1.

Fig. 5 is a longitudinal sectional elevation of a modified structure made in accordance with this invention.

Fig. 6 is a plan view of the structure shown in Fig. 5.

Fig. 7 is a sectional elevation of a portion of a structure somewhat similar to Fig. 5, but illustrates a modified form of construction.

Figs. 8 and 9 are respectively a plan view and a sectional elevation of another form of my improved aquarium.

Figs. 10 and 11 are plan views of still further forms of construction.

In Fig. 12 I have shown my invention in a structure modified into such a form that an aquarium may be used as a chandelier.

Fig. 13 is a plan view partly in section of the central portion of the structure of Fig. 12.

Like characters of reference designate corresponding parts in all the figures.

In the structure shown in Figs. 1–4, 10 designates the body or water receptacle portion of an aquarium. This, as shown, is constructed with a central portion 11 which forms a cylindrical open-ended chamber within the receptacle. This structure is designed to rest upon a metallic ornamental base 12 and may have a metallic rim 13 around the upper edge of the receptacle 10, and a metallic rim 14 around the upper edge of the cylindrical walls 11. 15—15 are side pockets of glass or other suitable transparent material which in this case are cast integrally with the receptacle 10 at the ends thereof, and, as shown in Fig. 1, of less height than that of the receptacle 10.

20 is a lamp,—in this case an ordinary incandescent lamp mounted in a standard 21 which is of such proportions as to cause the lamp 20 to extend into the cylindrical chamber intermediate the bottom of the receptacle 10 and the upper surface of the water therein. 30 designates a casing in which is a motor; for example, a clockwork mechanism by means of which a pinion 31 is rotated. 32 is a gear in mesh with this pinion, the upper surface of which is constructed to form an annular groove 33 in which may be placed a cylindrical transparent screen which, by means of the motor mechanism, may be rotated within the cylindrical chamber formed by the partition walls 11. This transparent screen is preferably constructed of a number of colored portions 34—35—36—37 of different colors which may be joined together along spiral lines as shown.

40 is a vase provided with a spider-like flange 41 adapted to rest upon the metallic rim 14 without obstructing the free passage of air up through the cylindrical chamber in which the light 20 is placed.

In Fig. 5 the water receptacle is designated by 10^A and the walls which form the cylindrical chamber in the center of this receptacle, by 11^A. The side pockets 15^A are, as in the former case, cast integrally with the rest of the structure, but in this form of my invention the device is made to form its own base so that the metallic base used in the device shown in Figs. 5 and 6 may be dispensed with. In the form of aquarium illustrated in Fig. 1, certain aqueous plants, such as are commonly used in aquariums, are shown at 16. In the side pockets 15, a certain amount of soil is shown at 17 with plants 18 growing therein. Similarly, plants 19 are shown in soil contained within the vase 40.

The plants within and without the water receptacle of the aquarium harmonize to increase the attractiveness of the appearance of the structure and to make a more beautiful setting for the fish within the receptacle. The effect is greatly enhanced by placing within the central chamber an artificial light, the rays of which will pass between the vegetation within and without the aquarium and which will of course reflect upon the moving fish within the receptacle.

The beauty is still further enhanced by the interposition between the lamp 20 and the receptacle 10 of the cylindrical color screens which are preferably so mounted that they may be removed and others of different colors inserted in their place. When however, means are provided for rotating these color screens, they may be made as described with parts of different colors so that the rotation imparted to them makes a constantly changing color effect which is unique and I believe entirely original with me.

In the structure shown in Fig. 7, the side pockets 15^B are cast separately from the structure which forms the receptacle and which in this case is designated by 10^B and are provided with an overhanging flange which fits over the upper edge of the receptacle 10^B. The advantage of this form of construction is that the side pockets may be used or not as they are removable at will.

Figs. 8 to 10 inclusive are added to show that aquariums made in accordance with this invention may have a great variety of form. For example, that shown in Figs. 8 and 9 has a water receptacle 10^C of elliptical cross-section. The cylindrical chamber is formed in the center of the receptacle by the walls 11^C. The side pockets 15^C are in this case formed on the minor axis of the ellipse.

The structure of Fig. 10 is similar, but the side pockets 15^D are formed on the ends of the receptacle 10^D or on the major axis of the ellipse.

Fig. 11 shows an aquarium of substantially circular cross section of which the main receptacle is designated by 10^E, the walls of the light chamber by 11^E and the side pockets,—four in number,—by 15^E.

In the form of construction shown in Figs. 12 and 13 the main receptacle is designated by 10^F and the walls of the light chamber by 11^F. In this case the aquarium proper is made in the form of a bowl and the light chamber is closed at the bottom, but yet is within the main receptacle and is for the same purpose, of providing an air space for a lamp inside of the water and fish receptacle.

The bowl is constructed with an enlarged rim 50 around which is fitted an annular metallic structure 51 to which chains 42 are attached at intervals. By means of these chains the structure may be suspended from a ceiling or other overhead structure.

From the upper end of the light chamber walls 11^F extend radial arms 43 which are integrally connected by a flat annular ring 44 which rests upon the rim 50 of the bowl and between this rim and a part of the metallic annular structure 51. By this means the light chamber is supported in the center of the aquarium.

The lamp 20^A depends from a dome-like hood 45 which is supported above the upper end of the light chamber by brackets 46 and forms a reflector for sending such light rays as strike it, down through the aquarium. The brackets separate this reflecting hood from the upper rim of the light chamber somewhat, to provide for ventilation and the hood is also provided with vents 47 which provide for the free escape of any air which becomes heated by the lamp.

The hood and lamp merely rest upon the light chamber structure and may be lifted off readily. This then provides for the insertion and exchange of colored light screens 38.

I have illustrated and described a number of widely different forms of aquariums which embody my invention, for the purpose of showing a few of the many applications of the invention and to show that structures of many different kinds may be made in accordance therewith.

What I claim is:

1. An ornamental aquarium comprising a water receptacle of transparent material, a central light chamber also formed of transparent material within the water receptacle, a lamp in said chamber above the bottom of said receptacle and below the surface of the water therein, means for supporting a color screen within the light chamber, and a removable transparent colored screen within said chamber and surrounding said lamp.

2. An ornamental aquarium comprising a water receptacle of transparent material, a central cylindrical open-ended light chamber also formed of transparent material within the water receptacle, a lamp in said chamber above the bottom of the receptacle, and below the surface of the water therein, means for supporting a color screen within the light chamber, and a removable cylindrical transparent colored screen within said chamber and surrounding said lamp.

3. An ornamental aquarium comprising a water receptacle of transparent material, a central cylindrical open-ended light chamber also formed of transparent material within the water receptacle, a lamp in said chamber above the bottom of the receptacle, and below the surface of the water therein, means for supporting a color screen within the light chamber, a multi-colored cylindrical transparent screen within said chamber and surrounding said lamp, and means for supporting and rotating said color screen.

4. An ornamental aquarium comprising a water receptacle of transparent material, a central cylindrical open-ended light chamber also formed of transparent material within the water receptacle, a lamp in said chamber above the bottom of the receptacle, and below the surface of the water therein, a cylindrical transparent screen comprising a plurality of spirally disposed portions of different colors within said chamber and surrounding said lamp, and means for rotating said color screen.

5. An ornamental aquarium comprising a water receptacle of transparent material, a central light chamber also formed of transparent material within the water receptacle, a lamp in said chamber above the bottom of said receptacle and below the surface of the water therein, and side pockets also formed of transparent material on the outside of the water receptacle.

6. An ornamental aquarium comprising a water receptacle of transparent material, a central cylindrical open-ended light chamber also formed of transparent material within the water receptacle, a lamp in said chamber above the bottom of the receptacle and below the surface of the water therein, side pockets on the outside of the water receptacle of less height than that of said receptacle, and a vase adapted to be supported upon without obstructing the upper end of said light chamber.

7. An ornamental aquarium comprising a water receptacle of transparent material, a central cylindrical open-ended light chamber also formed of transparent material within the water receptacle, a lamp in said chamber above the bottom of the receptacle, and below the surface of the water therein, and a removable cylindrical color screen within said chamber and surrounding said lamp; side pockets on the outside of the water receptacle of less height than that of said receptacle, and a vase adapted to be supported upon without obstructing the upper end of said light chamber.

In witness whereof, I have hereunto set my hand this 25 day of February, 1916.

RUDOLF EICKEMEYER.